US010992916B2

(12) United States Patent
Schmidt et al.

(10) Patent No.: US 10,992,916 B2
(45) Date of Patent: Apr. 27, 2021

(54) DEPTH DATA ADJUSTMENT BASED ON NON-VISUAL POSE DATA

(71) Applicant: GOOGLE LLC, Mountain View, CA (US)

(72) Inventors: Mirko Schmidt, San Francisco, CA (US); Ivan Dryanovski, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/659,971

(22) Filed: Jul. 26, 2017

(65) Prior Publication Data
US 2019/0037194 A1    Jan. 31, 2019

(51) Int. Cl.
*H04N 13/128* (2018.01)
*G06T 19/00* (2011.01)
*H04N 13/122* (2018.01)
*H04N 13/344* (2018.01)
*H04N 13/366* (2018.01)
*H04N 5/222* (2006.01)
(Continued)

(52) U.S. Cl.
CPC .............. *H04N 13/128* (2018.05); *G01S 7/51* (2013.01); *G01S 17/86* (2020.01); *G01S 17/89* (2013.01); *G06T 19/006* (2013.01); *H04N 5/2226* (2013.01); *H04N 5/23258* (2013.01); *H04N 13/122* (2018.05); *H04N 13/344* (2018.05); *H04N 13/366* (2018.05); *H04N 5/2329* (2013.01); *H04N 5/23267* (2013.01)

(58) Field of Classification Search
CPC ....... G06T 7/0075; G06T 7/0002; G06T 3/60; G06T 3/20; G06T 5/001; G06T 5/50; H04N 5/23258; H04N 13/128
See application file for complete search history.

(56) References Cited

U.S. PATENT DOCUMENTS 6,757,446 B1 *  6/2004  Li ........................ G06T 3/0093
                                                          345/647
10,241,569 B2 *  3/2019  Lanman .................. G06T 5/002
(Continued)

FOREIGN PATENT DOCUMENTS

| CN | 106934828 A | 7/2017 |
| CN | 108352056 A | 7/2018 |
| KR | 20160091337 A | 8/2016 |

OTHER PUBLICATIONS

International Search Report and Written Opinion dated Jul. 6, 2018 for corresponding International Application No. PCT/US2018/027569, 15 pages.
(Continued)

*Primary Examiner* — Neil R Mikeska

(57) ABSTRACT

An HMD adjusts adjusting depth information based on detected motion of the system. The HMD includes a depth camera that collects depth data for objects in the local environment of the HMD. The HMD further includes an inertial measurement unit (IMU) including non-visual motion sensors such as one or more accelerometers, gyroscopes, and the like. The HMD adjusts the received depth information based on motion data provided by the IMU, thereby improving the accuracy of the depth information, and in turn reducing visual artifacts that can result from inaccuracies in the depth information.

19 Claims, 4 Drawing Sheets

(51) Int. Cl.
*G01S 7/51* (2006.01)
*H04N 5/232* (2006.01)
*G01S 17/89* (2020.01)
*G01S 17/86* (2020.01)

(56) References Cited

U.S. PATENT DOCUMENTS

| | | | | |
|---|---|---|---|---|
| 2013/0107066 A1* | 5/2013 | Venkatraman | ..... | H04N 5/23248 348/208.4 |
| 2013/0176445 A1* | 7/2013 | Streeter | ................ | G01S 17/36 348/208.1 |
| 2014/0191927 A1* | 7/2014 | Cho | ................ | G02B 27/017 345/8 |
| 2014/0218569 A1* | 8/2014 | Tsubaki | ............... | H04N 5/2329 348/241 |
| 2015/0145985 A1* | 5/2015 | Gourlay | ................ | G06T 17/00 348/135 |
| 2016/0117860 A1* | 4/2016 | Fei | .................... | G06F 3/017 345/419 |
| 2016/0301908 A1* | 10/2016 | Itakura | .................... | G06T 5/40 |
| 2017/0011555 A1* | 1/2017 | Li | ............... | G06T 1/60 |
| 2017/0148168 A1* | 5/2017 | Lindner | ............ | G06T 7/0075 |
| 2017/0237974 A1* | 8/2017 | Samec | ................ | G06F 3/013 348/53 |
| 2017/0323429 A1* | 11/2017 | Godbaz | ............... | H04N 13/254 |
| 2017/0374256 A1* | 12/2017 | Wagner | ................ | G06T 7/0042 |
| 2017/0374343 A1* | 12/2017 | Boulton | ................ | H04N 13/00 |
| 2018/0007350 A1* | 1/2018 | Liu | ...................... | H04N 13/128 |
| 2018/0045960 A1* | 2/2018 | Palacios | .............. | G02B 27/017 |
| 2018/0211398 A1* | 7/2018 | Schmidt | .................. | G06T 7/514 |
| 2018/0307310 A1* | 10/2018 | McCombe | ............. | G06T 11/00 |
| 2019/0333480 A1* | 10/2019 | Lang | ................. | G02B 27/0172 |

OTHER PUBLICATIONS

Langmann, B. et al. "Real-Time Image Stabilization for ToF Cameras on Mobile Platforms," 18th International Conference on Medical Image Computing and Computer-Assisted Intervention—MICCAI 2015, ISSN: 0302-9743; Jan. 31, 2013, 13 pages.

Lindner, M. et al., "Compensation of Motion Artifacts for Time-of-Flight Cameras, " In: Lecture Notes in Computer Science, Jan. 1, 2009; Berlin, Hedelbert, Germany; XP055168556; ISSN: 0302-9743; vol. 5742; pp. 16-27.

International Preliminary Report on Patentability dated Feb. 6, 2020 for corresponding International Application No. PCT/US2018/027569, 9 pages.

Wang, Junchen et al., "Augmented Reality Navigation with Automatic Marker-Free Image Registration Using 3-D Image Overlay for Dental Surgery," IEEE Transactions on Biomedical Engineering, vol. 61, No. 4; Apr. 1, 2014; pp. 1295-1304.

European Office Action dated Jul. 16, 2020 for EP Application No. 18722810.1, 8 pages.

First Office Action dated Sep. 7, 2020 for Chinese Patent Application No. 201880033335.X, 18 pages.

\* cited by examiner

DEPTH DATA ADJUSTMENT BASED ON NON-VISUAL POSE DATA

BACKGROUND

Field of the Disclosure

The present disclosure relates generally to head mounted displays and other virtual reality (VR) and Augmented Reality (AR) display systems and more particularly to depth data for VR and AR display systems.

Description of the Related Art

Augmented reality (AR) and virtual reality (VR) applications can be enhanced by identifying features of a local environment using machine vision and display techniques, such as simultaneous localization and mapping (SLAM), structure from motion (SFM), visual inertial odometry (VIO), and visual inertial mapping. To support these techniques, a VR display system, such as a head mounted display (HMD), can navigate an environment while simultaneously constructing a map (3D visual representation) of the environment based on non-visual sensor data, analysis of captured imagery of the local environment, or a combination thereof. The map can be further enhanced based on depth information collected from a depth camera of the VR display system. However, the depth information can be unreliable or inaccurate, resulting in the display of artifacts that are detrimental to the user experience.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate techniques for adjusting depth information received at an HMD or other VR and AR display system based on detected motion of the system. In at least one embodiment, the HMD includes a depth camera that collects depth data for objects in the local environment of the HMD. The HMD further includes an inertial measurement unit (IMU) including non-visual motion sensors such as one or more accelerometers, gyroscopes, and the like. The HMD adjusts the received depth information based on motion data provided by the IMU, thereby improving the accuracy of the depth information, and in turn reducing visual artifacts that can result from inaccuracies in the depth information. The HMD is thus able to provide an improved VR or AR experience.

In particular, a conventional depth camera typically generates depth information by creating a depth map or image (referred to herein generally as depth information) based on a set of raw images. The depth camera captures the images over a relatively short span of time. However, the HMD can experience motion over the span of time, resulting in variations between the set of raw images. These variations, in turn, can cause the errors in the depth information. Moreover, when the HMD generates a VR environment or AR environment based on the depth information, these errors can cause generation of visual artifacts that are distracting to the user. Accordingly, by adjusting the depth information based on the motion indicated by the IMU, the HMD can reduce or eliminate the visual artifacts and enhance the user experience.

For purposes of description, FIGS. 1-4 are described with respect to the example of a VR display system, and with respect to the example of generation of VR content. However, it will be appreciated that the techniques described herein also apply and can be implemented in AR display systems and for the generation of AR content.

Figure 1A:
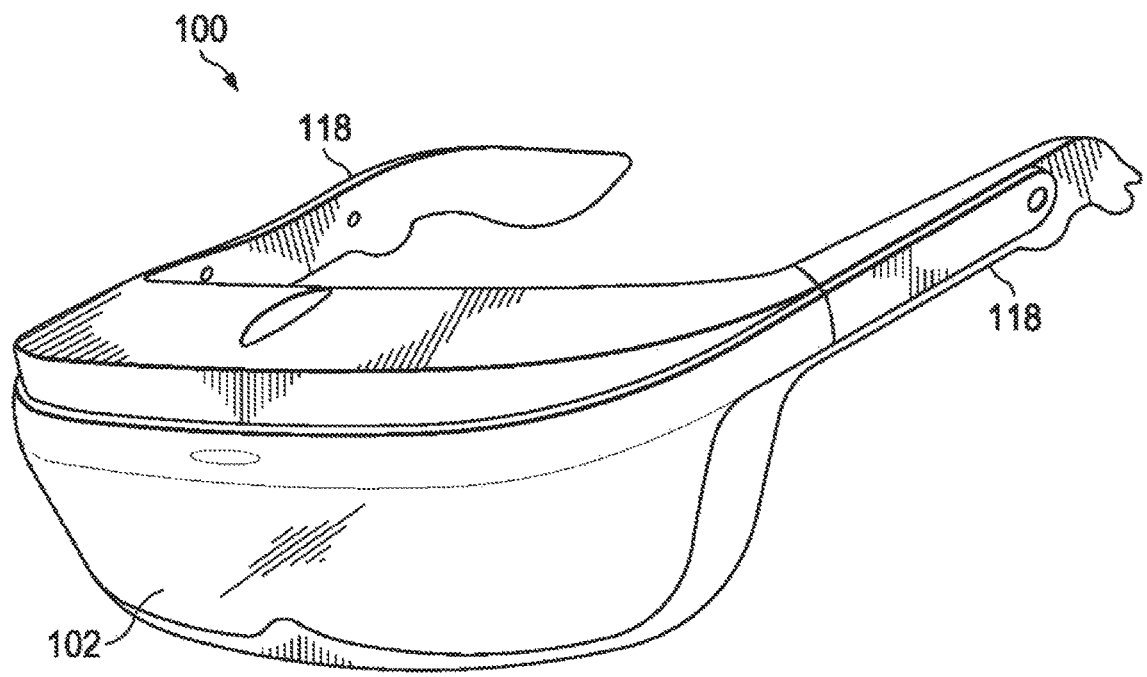
FIG. 1A is a diagram of an HMD that adjusts depth information based on detected motion in accordance with at least one embodiment of the present disclosure.
Figure 1B:
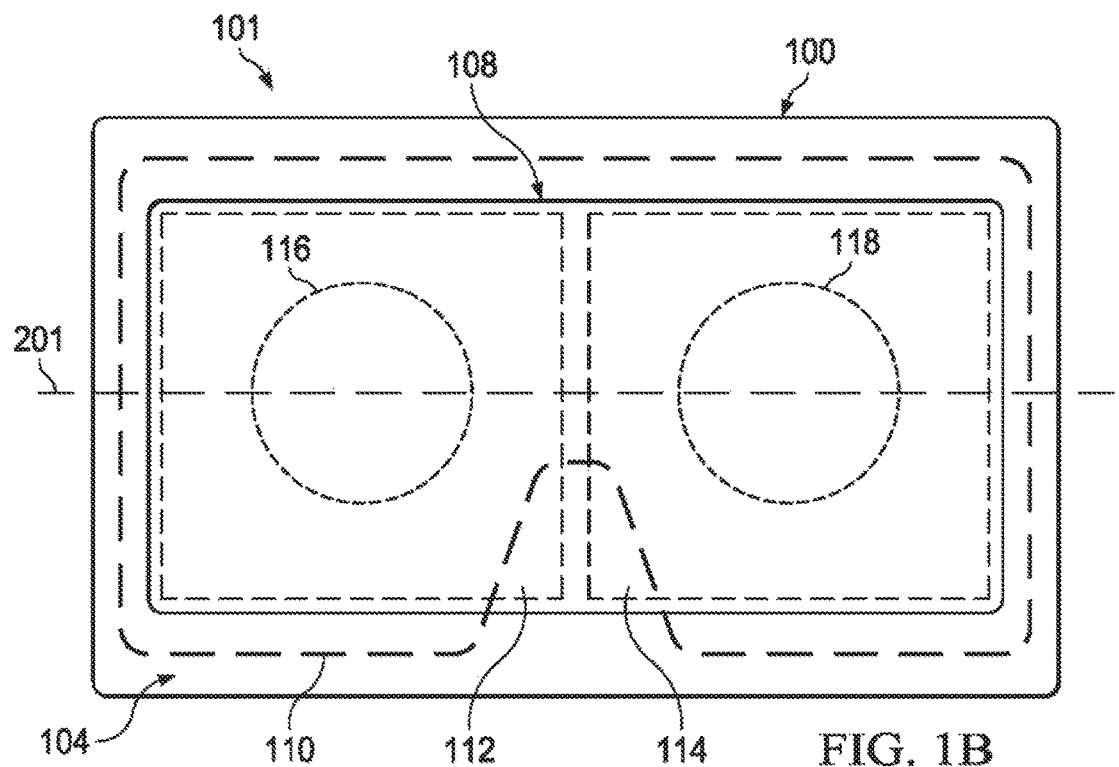
FIG. 1B is a diagram of an alternate view of the HMD of FIG. 1 in accordance with at least one embodiment of the present disclosure.

FIGS. 1A and 1B illustrate different views of an HMD 100 that can adjust captured depth information based on detected motion in accordance with at least one embodiment of the present disclosure. It will be appreciated that the HMD 100 is only one example of an electronic device that can implement the techniques described herein, and that these techniques can be implemented in any of a variety of electronic devices without departing from the scope of the disclosure. Examples of such electronic devices include, but are not limited to, other VR display devices such as a tablet computer, computing-enabled cellular phone (e.g., a "smartphone"), a notebook computer, a personal digital assistant (PDA), a gaming console system, and the like. In other embodiments, the electronic device can include a fixture device, such as medical imaging equipment, a security imaging sensor system, an industrial robot control system, a drone control system, and the like.

FIG. 1A illustrates the HMD 100 form factor in accordance with an illustrative embodiment of the present disclosure. The HMD 100 may be implemented in other form factors, such as a smart phone form factor, tablet form factor and the like, which implement configurations analogous to those illustrated. In the depicted example, the HMD 100 has a housing 102 that is mounted on the head of a user by a set of straps 118 or harness such that display devices mounted on or within the housing 102 are arranged in front of the user's eyes. As described further herein, a processor coupled to or embedded within the housing 102 generates VR content for display at the display devices, thereby immersing the user in a VR environment associated with the VR content.

In at least one embodiment, and as described further herein, the HMD 100 includes a plurality of sensors to capture information about the pose (position and orientation) of the HMD 100, information about motion of the HMD 100 (as indicated, for example, by different poses over time), and information about objects in the local environment of the HMD 100. The HMD 100 can employ this information to generate more immersive VR content. For example, as the user moves about the local environment, the HMD 100 can employ the captured information to alter the VR content, such that the user feels as if they are moving through a virtual environment.

In at least one embodiment, the above-referenced sensors of the HMD 100 include a depth camera to capture depth information for the local environment and an inertial measurement unit (IMU) to capture information indicating the movement of the HMD 100 as the user moves, for example, her head. As described further herein, the HMD 100 can adjust the captured depth information based on motion information provided by the IMU, thereby improving the accuracy of the captured depth information, and in turn reducing visual artifacts in the VR environment generated by the HMD 100.

FIG. 1B illustrates a back-plan view 101 of an illustrative embodiment of the HMD 100 of FIG. 1A in accordance with at least one embodiment of the present disclosure. As illustrated by the back-plan view 100 of FIG. 1B, the HMD 100 includes a display device 108 disposed at a surface 104, a face gasket 110 for securing the electronic device 100 to the face of a user (along with the use of straps or a harness), and eyepiece lenses 116 and 118, one each for the left and right eyes of the user 110. As depicted in the back-plan view 101, the eyepiece lens 116 is aligned with a left-side region 112 of the display area of the display device 108, while the eyepiece lens 118 is aligned with a right-side region 114 of the display area of the display device 108. Thus, in a stereoscopic display mode, imagery captured by an imaging sensor (not shown) may be displayed in the left-side region 112 and viewed by the user's left eye via the eyepiece lens 116 and imagery captured by the imaging sensor may be displayed in the right-side region 114 and viewed by the user's right eye via the eyepiece lens 118. In the depicted example, the eyepiece lenses 116 and 118 are symmetrical about a centerline 201 to reduce potential distortion in the display of VR content.

Figure 2:
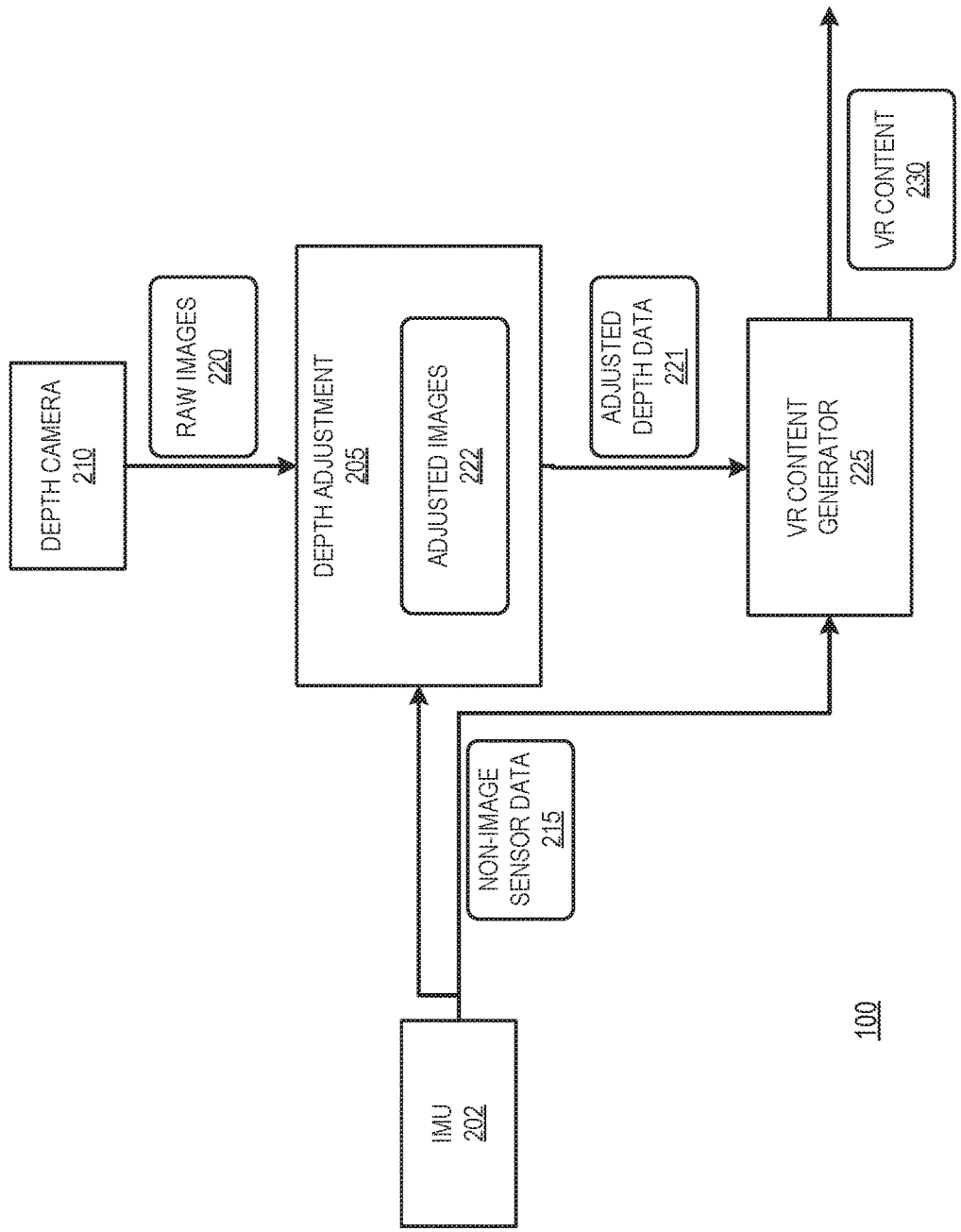
FIG. 2 is a block diagram of aspects of the HMD of FIG. 1 that adjust depth information based on detected motion in accordance with at least one embodiment of the present disclosure.

FIG. 2 illustrates a block diagram of aspects of the HMD 100 in accordance with at least one embodiment of the present disclosure. In the depicted example, the HMD 100 includes an IMU 202, a depth adjustment module 205, a depth camera 210, and a VR content generator 225. It will be appreciated that the example of FIG. 2 illustrates only a portion of the aspects of the HMD 100 and that the HMD 100 can include additional modules and functionality to that illustrated at FIG. 2. For example, in at least one embodiment the HMD 100 can include one or image capture devices (e.g., a camera) to capture imagery of the local environment of the HMD 100, supporting generation of more immersive VR content.

The IMU 202 is a module which includes one or more sensors that sense one or more aspects of motion of the HMD 100, such as angular velocity, linear or a combination thereof. For example, in at least one embodiment the IMU 202 includes one or more accelerometers to sense linear motion of the HMD 100, and further includes one or more gyroscopes to sense angular velocity of the HMD 100. In the example of FIG. 2, the IMU 202 compiles the information generated by the sensors to generate non-image sensor data 215, which indicates detected motion of the HMD 100 at a corresponding instant in time. In at least one embodiment, the HMD 100 periodically updates the non-image sensor data 215 at a specified frequency, such that the non-image sensor data 215 reflects the motion of the HMD 100 over time.

The depth camera 210 is a device generally configured to capture images of the environment around the HMD 100 and, based on the images, generate depth data 220. In at least one embodiment, the depth camera 210 is a time-of-flight (TOF) camera that generates the depth data by emitting a pulse of light, capturing a plurality of images, illustrated as raw images 220, of the environment over time. In other embodiments, the depth camera 210 emits a series of light pulses to capture the raw images 220. In still other embodiments, the depth camera emits modulated light over time to capture the raw images 220.

However, as explained above, in some scenarios user of the HMD 100 may move while the raw images 220 are being captured by the depth camera 210. This motion can change the pixel values corresponding to a given depth point relative to the pixel values if the HMD 100 were stationary. This change in pixel values can, in turn, cause errors in the generation of depth data based on the raw images 210. To address these errors, the HMD 100 includes the depth adjustment module 205. In particular, the depth adjustment module 205 is generally configured to receive the non-image sensor data 215 and the raw images 220, and is further configured to adjust the raw images 220 based on the non-image sensor data 215 to generate a set of adjusted images 222. The depth adjustment module 205 generates the adjusted images to account for movement of the HMD 100 while images are being captured by the depth camera 210. That is, the depth adjustment module 205 generates the adjusted images 222 to more closely reflect, relative to the raw images 220, the images that would have been generated by the depth camera 210 if the HMD 100 had not moved while the plurality of images were being captured. The depth adjustment module 205 then generates, using convention depth information generation techniques, adjusted depth data 221 based on the adjusted images 222.

In at least one embodiment, the depth adjustment module 205 generates the adjusted depth data 221 as follows: the depth camera 210 acquires raw data frames $f_1, f_2, \ldots, f_n$ times $t_1, t_2, \ldots, t_n$ which are processed into a single depth image $d_n$ at time $t_n$. The change of position and orientation of the camera between two raw frames $f_i$ and $f_n$ is indicated by the non-image sensor data 215 and is given by the transformation $_n^iT$, that is the transformation from the camera of $f_i$ to $f_n$ expressed in the reference frame of the camera of $f_i$.

The depth adjustment module 205 transforms a given raw image $f_i$ generated by the depth camera into the corrected raw image $f'_i$, where $f'_i$ uses the same camera as $f_n$. For each pixel $p_{i(u,v)}$ of frame $f_i$ with coordinates (u,v), the depth adjustment module 205 computes a ray $r_{i,(u,v)}$ according to the following formulae:

$$x = (u - C_x)/f_x$$

$$y = (v - C_y)/f_y$$

$$r_{i,(u,v)} = [x, y, 1.0]^T$$

Where (u,v) are the pixel coordinates of $p_{i(u,v)}$, x, y are normalized image coordinates, $C_x$, $C_y$ is the center of projection, and $f_x$, $f_y$ is the horizontal/vertical focal length.

The depth adjustment module 205205 transforms the ray to the camera of frame $f_n$ according to the following formula:

$$r'_{i,(u,v)} = {_n^iT} \cdot r_{i,(u,v)}$$

The depth adjustment module 205205 then projects the transformed ray into a new pixel according to the following formula:

$$p'_{i,(u,v)} = \text{PointToPixel}(r'_{i,(u,v)})$$

where PointToPixel can be implemented according to the following formulae:

$u' = f_x \cdot r'_i[0]/r'_i[2] + C_x$ $v' = f_y \cdot r'_i[1]/r'_i[2] + C_y$ $p'_{i,(u,v)} = [u', v']^T$ The depth adjustment module 205205 checks to determine if the new position $p'_{i,(u,v)}$ is within image boundaries. If not, the depth adjustment module 205205 sets the pixel value to an invalid state. If the new pixel is within the image boundary, the depth adjustment module 205 updates the pixel data at position $p'_{i,(u,v)}$ with the pixel value at position $p'_{i,(u,v)}$ of the image $f_i$.

The depth adjustment module 205 corrects pixels of $f_i$ for all raw frames except the last one. In some embodiment, all pixels of the image $f_i$ are corrected. In other embodiments, the HMD 100 can identify an "area of interest" of the image $f_i$ based on, for example, a gaze direction of the user, and correct only those pixels that lie within the area of interest. In still other embodiments, the HMD 100 can identify individual frames for correction based on, for example, a degree of motion of the HMD 100, and adjust only a subset of the captured frames, such as adjusting only those frames having associated with greater than a threshold amount of motion or difference from a previous frame. After correcting one or more of the raw frames, the depth adjustment module 205 then computes a corrected depth image for time to using the corrected raw frames and the last uncorrected raw frame according to the following formula:

$[f'_1, f'_2, \ldots f'_{n-1}, f_n] \rightarrow d'_n$.

The depth adjustment module 205 stores the corrected depth image at the adjusted depth data 221. As explained above the corrected depth image is computed from raw frames for which relative motion has been corrected. Therefore, the corrected depth image $d'_n$ shows less motion artifacts than the original depth image $d'_n$.

The VR content generator 225 is configured to generate VR content 230 based on the adjusted depth data 221. The VR content generator 225 can therefore be software executing at a processor of the HMD 100 to generate VR content, can be one or more hardware modules specially designed or configured to generate VR content, or a combination thereof. In at least one embodiment, the VR content generator 225 employs the adjusted depth data to generate virtual objects representative of, or otherwise based on, objects in the local environment of the HMD 100 that are indicated by the adjusted depth data 221. For example, the VR content generator 225 can determine the contours of an object in the local environment of the HMD 100 based on different depth values for depth points of the adjusted depth data 221. The VR content generator 225 can generate the VR content 230 to include virtual objects having contours matching, or otherwise based on, the contours of the objects indicated by the adjusted depth data 221. In at least one embodiment, the VR content generator 225 generates the VR content 230 based on other information in addition to the adjusted depth data 221. For example, the VR content generator can employ captured visual images, stored feature descriptors of 3D objects, stored maps of the local environment, geolocation information, and the like, to generate the VR content 230.

Because the depth data 220 is adjusted based on the motion of the HMD 100 indicated by the non-image sensor data 215 (that is, because the VR content generator 225 employs the adjusted depth data 221), the VR content 230 is likely to have fewer visual artifacts relative to VR content generated directly from the depth data 220. In particular, because of errors in the depth data 220, VR content generated directly from the depth data 220 can include visual artifacts, such as distorted virtual objects, virtual objects that "float" or persist in the virtual environment after the corresponding object in the local environment has moved or changed, and the like. By employing the adjusted depth data 221 to generate the VR content 230, the VR content generator 221 is able to support a reduced level of such artifacts, thereby improving the user experience.

Figure 3:
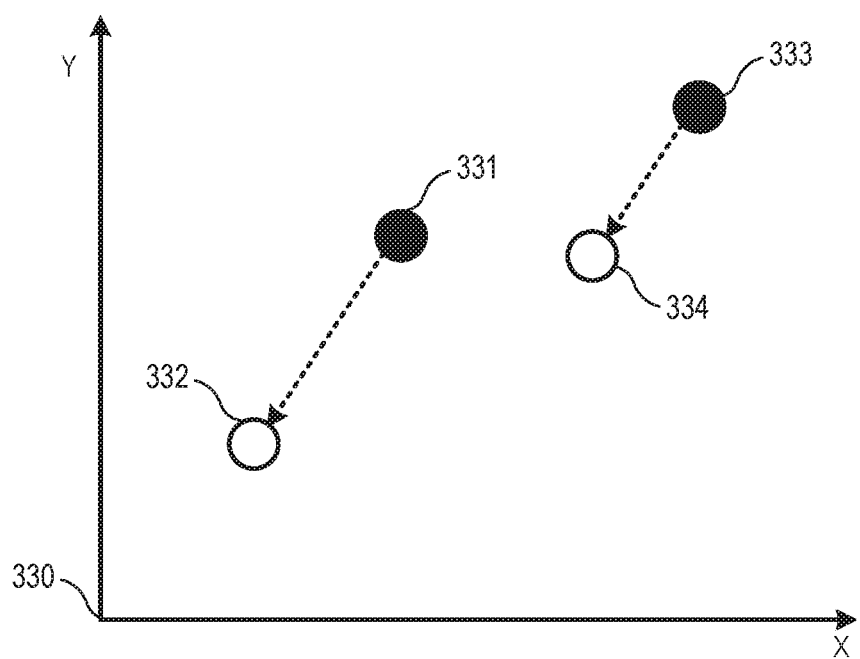
FIG. 3 is a diagram illustrating an example of the HMD of FIG. 1 adjusting depth information based on detected motion in accordance with at least one embodiment of the present disclosure.

FIG. 3 illustrates an example of the depth adjustment module 205 adjusting depth data based on the non-image sensor data 215 in accordance with at least one embodiment of the present disclosure. FIG. 3 depicts raw image data 220 relative to a frame of reference 330, with the frame of reference 330 including an x-axis, and a y-axis. In the depicted example, points 331 and 333 represent pixel positions of one of raw images 220. That is, points 331 and 333 are unadjusted pixel positions.

To adjust the raw image, the depth adjustment module 205 changes pixel values of the image to effectively translate one or more pixels from one location image to another, wherein the translation of each pixel is based on the non-image sensor data 215 as described above. In the depicted example, based on the non-image sensor data 215 the depth adjustment module 205 translates point 331 to point 332 and translates point 333 to point 334. After translating each pixel, the depth adjustment module 205 stores the resulting pixels as a frame of the adjusted images 222.

In at least one embodiment, the depth adjustment module 205 translates different points by different amounts, in different directions, or a combination thereof. Thus, for example, based on the non-image sensor data 215 the depth adjustment module 205 can translate point 331 by a given amount, in a given direction (e.g. along a given vector), and can translate point 332 by a different amount, in a different direction (e.g. along a different vector). In addition, the depth adjustment module 205 can determine that one or more points of the depth data 220 are not to be adjusted, as the non-image data 205 indicates those points are not affected by motion of the HMD 100. Accordingly, for such points the adjusted depth data 221 will match corresponding points of the depth data 220.

Figure 4:
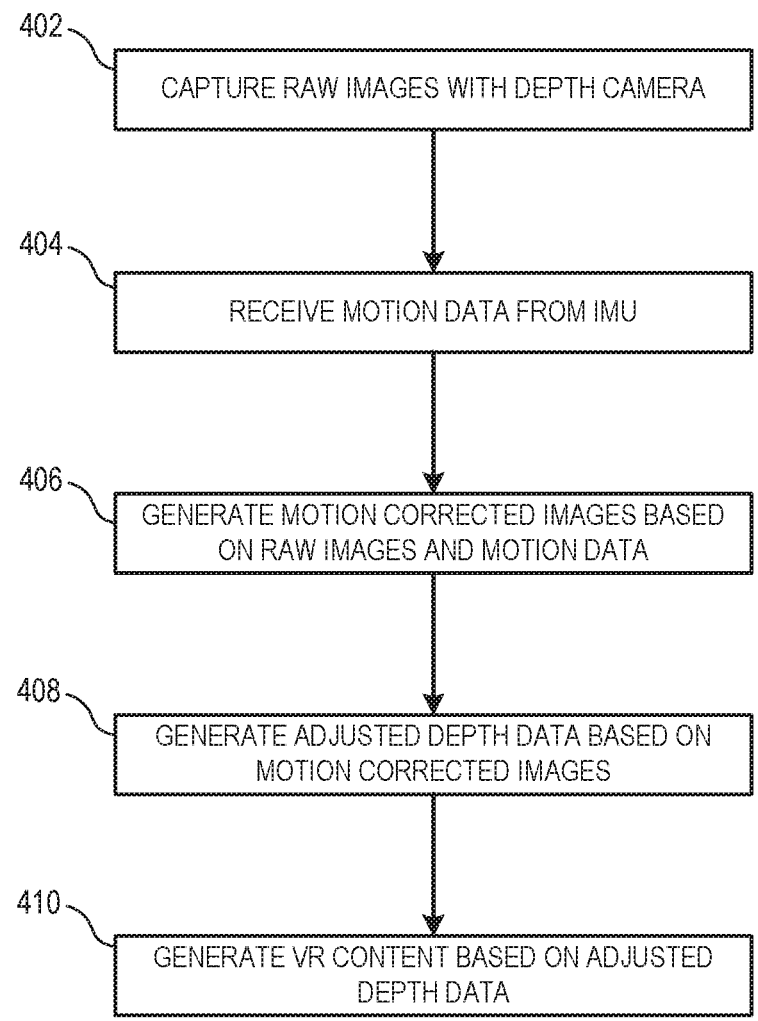
FIG. 4 is a flow diagram of a method of the HMD of FIG. 1 adjusting depth information based on detected motion in accordance with at least one embodiment of the present disclosure.

FIG. 4 illustrates a flow diagram of a method 400 of the HMD 100 adjusting depth information based on detected motion in accordance with at least one embodiment of the present disclosure. At block 402, the depth camera 210 captures a set of raw images of a local environment of the HMD 100. At block 404, the IMU 202 captures the non-image sensor data 215, indicating motion of the HMD 100 while the depth camera 210 was capturing the raw images 220.

At block 406, the depth adjustment module 205 adjusts the raw images 220 based on the non-image sensor data 215 to generate the adjusted images 222. At block 408 the depth adjustment module 205 generates the depth data 221 based on the adjusted images 222. At block 410 the VR content generator 225 generates VR content 430 based on the adjusted depth data 221.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   identifying a first motion of a head mounted display (HMD);
   adjusting a first raw image received from a depth camera of the HMD based on the first motion to generate a first adjusted image;
   generating a first ray based on a center of projection and a focal length of the depth camera;
   transforming the first ray based on the first motion to generate a second ray;
   generating adjusted depth data based on a plurality of images including the first adjusted image, wherein the adjusted depth data is generated using a point-to-pixel representation of the second ray, the point-to-pixel representation being based on a first index representation of the second ray, a second index representation of the second ray, and a third index representation of the second ray;
   determining a first contour of an object in a local environment based on the adjusted depth data;
   generating virtual reality (VR) content that includes a virtual object having a second contour, the second contour matching the first contour; and
   providing the VR content at the HMD based on the adjusted depth data.

2. The method of claim 1, wherein identifying the first motion comprises:
   identifying the first motion based on non-visual sensor data received from sensors of the HMD.

3. The method of claim 2, wherein the sensors of the HMD comprise an inertial measurement unit (IMU) of the HMD.

4. The method of claim 1, wherein adjusting the first raw image comprises:
   adjusting the first raw image based on the center of projection and the focal length.

5. The method of claim 4, wherein adjusting the first raw image further comprises:
   adjusting the first raw image based on the second ray.

6. The method of claim 5, wherein adjusting the first raw image further comprises:
   generating a set of adjusted pixel values based on the second ray; and
   storing the set of adjusted pixel values as a frame of the first adjusted image.

7. The method of claim 1, wherein adjusting the first raw image comprises:
   adjusting a first pixel of a frame of the first raw image by a first amount; and
   adjusting a second pixel of the frame of the first raw image by a second amount different from the first amount.

8. A head mounted display (HMD) comprising:
   a motion detection module to identify a first motion of the HMD;
   a depth camera to generate a first raw image;
   a depth adjustment module to adjust the first raw image based on the first motion to generate a first adjusted image and to generate first adjusted depth data based on the first adjusted image by:
   generating a first ray based on a center of projection and a focal length of the depth camera;
   transforming the first ray based on the first motion to generate a second ray, wherein the first adjusted depth data is generated using a point-to-pixel representation of a second ray, the point-to-pixel representation being based on a first index representation of the second ray, a second index representation of the second ray, and a third index representation of the second ray; and
   a virtual reality (VR) content generator to determine a first contour of an object in a local environment based on the first adjusted depth data, generate VR content that includes a virtual object having a second contour, the second contour matching the first contour, and generate the VR content based on the first adjusted depth data.

9. The HMD of claim 8, wherein the motion detection module indicates the first motion based on non-visual sensor data.

10. The HMD of claim 9, wherein the motion detection module an inertial measurement unit (IMU).

11. The HMD of claim 8, wherein the depth adjustment module adjusts the first raw image by:
adjusting the first raw image based on the center of projection and the focal length.

12. The HMD of claim 11, wherein the depth adjustment module adjusts the first raw image by:
adjusting the first raw image based on the second ray.

13. The HMD of claim 12, wherein the depth adjustment module adjusts the first raw image by:
generating a set of adjusted pixel values based on the second ray; and
storing the set of adjusted pixel values as a frame of the adjusted depth data.

14. The HMD of claim 8, wherein the depth adjustment module adjusts the first raw image by:
adjusting a first pixel of a frame of the first raw image by a first amount; and
adjusting a second pixel of the frame of the first raw image by a second amount different from the first amount.

15. A non-transitory computer readable medium embodying instructions to manipulate a processor to execute a method comprising:
identifying a first motion of a head mounted display (HMD);
adjusting a first raw image received from a depth camera of the HMD based on the first motion to generate a first adjusted image;
generating a first ray based on a center of projection and a focal length of the depth camera;
transforming the first ray based on the first motion to generate a second ray;
generating adjusted depth data based on the first adjusted image, wherein the adjusted depth data is generated using a point-to-pixel representation of a second ray, the point-to-pixel representation being based on a first index representation of the second ray, a second index representation of the second ray, and a third index representation of the second ray;
determining a first contour of an object in a local environment based on the adjusted depth data;
generating virtual reality (VR) content that includes a virtual object having a second contour, the second contour matching the first contour; and
providing the VR content at the HMD based on the adjusted depth data.

16. The non-transitory computer readable medium of claim 15, wherein identifying the first motion comprises:
identifying the first motion based on non-visual sensor data received from sensors of the HMD.

17. The non-transitory computer readable medium of claim 16, wherein the sensors of the HMD comprise an inertial measurement unit (IMU) of the HMD.

18. The non-transitory computer readable medium of claim 17, wherein adjusting the first raw image comprises:
adjusting the first raw image based on the center of projection and the focal length.

19. The non-transitory computer readable medium of claim 18, wherein adjusting the first raw image further comprises:
adjusting the first raw image based on the second ray.

* * * * *